No. 662,249. Patented Nov. 20, 1900.
A. W. CADMAN.
VALVE.
(Application filed Nov. 7, 1899.)
(No Model.)
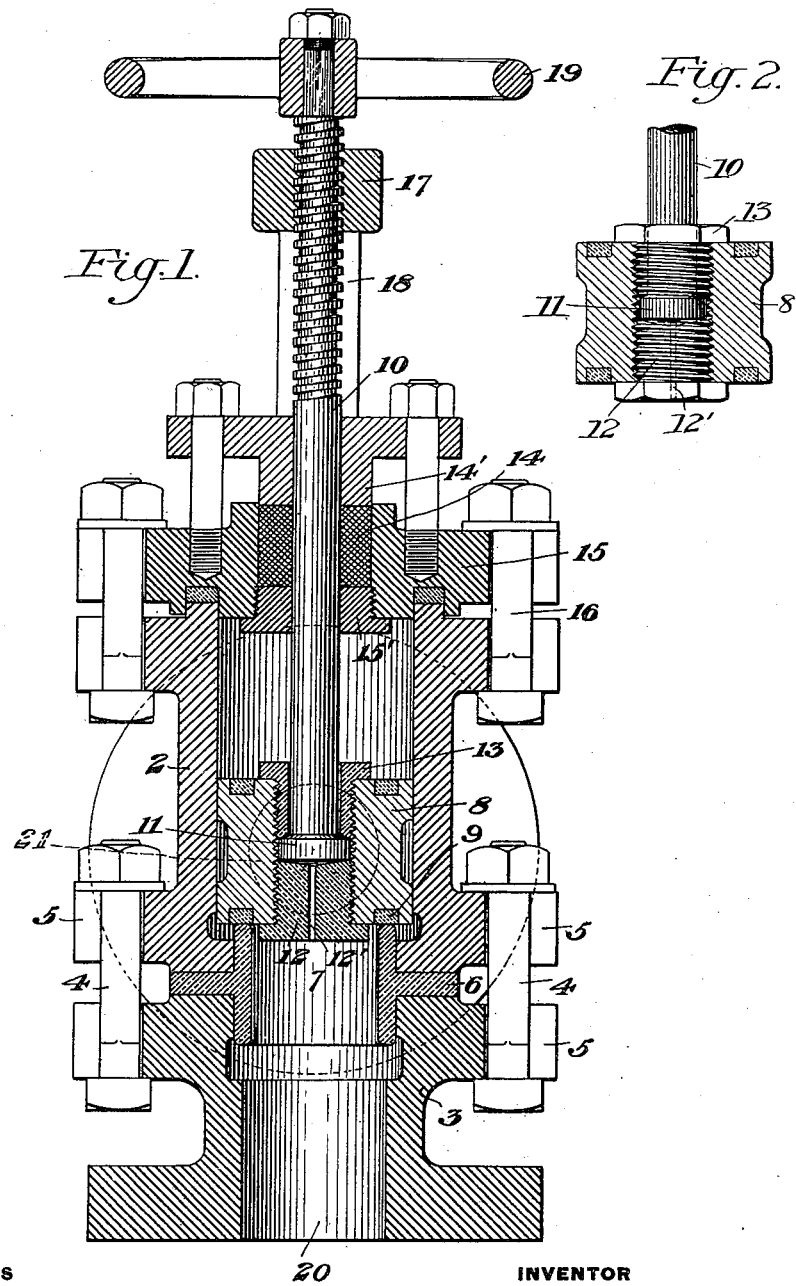

UNITED STATES PATENT OFFICE.

ALEXANDER W. CADMAN, OF EDGEWOOD, PENNSYLVANIA.

VALVE.

SPECIFICATION forming part of Letters Patent No. 662,249, dated November 20, 1900.

Application filed November 7, 1899. Serial No. 736,164. (No model.)

*To all whom it may concern:*

Be it known that I, ALEXANDER W. CADMAN, of Edgewood, in the county of Allegheny and State of Pennsylvania, have invented a new and useful Improvement in Valves, of which the following is a full, clear, and exact description, reference being had to the accompanying drawings, forming part of this specification, in which—

Figure 1 is a vertical section of my improved valve, and Fig. 2 is a detail view showing the threads on the parts 8, 12, and 13.

My invention relates to that class of valves wherein a movable valve is forced against the end of a ring-shaped valve-seat; and its object is to lengthen the life of such valves and to facilitate and cheapen the fixing and removing of the valve-seat, and further to avoid liability of loosening the valve from its stem.

In the drawings, I show a hollow valve-casing composed of two parts, 2 and 3, which are secured together by suitable bolts 4, extending through registering lugs 5 upon these parts. Between the two parts of the casing is clamped an annular plate 6, forming part of the valve-seat 7, which is made reversible by providing flanges or seats which extend in opposite directions. The annular plate 6 projects from the exterior of the valve-seat and affords means by which it is clamped firmly in place. In this construction by merely loosening the lower part 3 of the casing the valve-seat may be taken out and turned upside down, thus giving a new seat when its upper portion becomes worn in service. An important advantage of thus clamping the annulus 6 of the valve-seat between the portions of the valve-casing is that the valve-seat is not only reversible but is held very securely, and any leakage which may take place around the seat will escape to the exterior of the valve-casing, and not into the lower port 20.

The valve proper consists of a hollow bushing 8, which is interiorly provided with left-hand screw-threads, its ends having annular recesses to receive a soft-metal filling 9, which contacts with the valve-seat. The valve-stem 10 is provided with a boss 11 at its lower end, and the valve proper is secured loosely to the stem by a lower screw-plug 12 and an upper hollow screw-plug 13, these plugs being screwed in from opposite ends. The valve-stem extends through the usual stuffing-box 14 and gland 14', secured in a removable cap 15, which cap is secured to the casing by suitable bolts 16. The base of the stuffing-box is constituted by an annular nut 15', which fits around the valve-stem. The upper portion of the stem is provided with right-hand screw-threads and extends through a similar screw-threaded hole in the collar 17, secured to suitable side standards 18. The upper end of the stem is provided with the usual hand-wheel 19.

I prefer to form in the screw-plug 12 a small hole 12', leading from the base of the valve-stem. This enables me by slackening the valve-stem to uncover said hole and to permit a leakage of water in a small quantity along the stem and through the hole. This may be desirable in cold weather where the valve is in an exposed place, for the small flow of water thus permitted will keep the valve from freezing.

I have shown my valve as adapted for a blow-off valve, the fluid entering through the side port 21 (shown by dotted lines) and passing out through the lower port 20; but it is obvious that the construction may be used with a straight-way valve or in many other connections.

The advantages of the invention result from the ease with which the valve-seat may be secured in place and removed, from the use of the reversible or double-ended valve-seat, and from the peculiar construction of the valve proper. By securing the valve with the left-hand-threaded plugs, the threads being of opposite pitch from the threads on the valve-stem and collar 17, the rotation of the valve-stem will not tend to loosen them by the friction of the boss, which might occur if right-hand threads were used in this connection.

Many changes may be made in the form and arrangement of the parts without departing from my invention.

I claim—

1. The combination with a valve-casing made in transversely-divided portions, of a removable double-ended valve-seat having an annular projection which extends between the casing-sections to their exterior, said sections having projections, and bolts connecting the sections and clamping the valve-seat projection between them; and in immediate engagement therewith; substantially as described.

2. A hollow valve having interior screw-threads, a valve-stem rotatably secured thereon by screw-plugs, and a collar engaging a screw-thread on the stem, the screw-threads on said plugs being of opposite pitch from the screw-thread on said collar; substantially as described.

In testimony whereof I have hereunto set my hand.

ALEXANDER W. CADMAN.

Witnesses:
THOMAS W. BAKEWELL,
H. M. CORWIN.